Figures 1, 2:
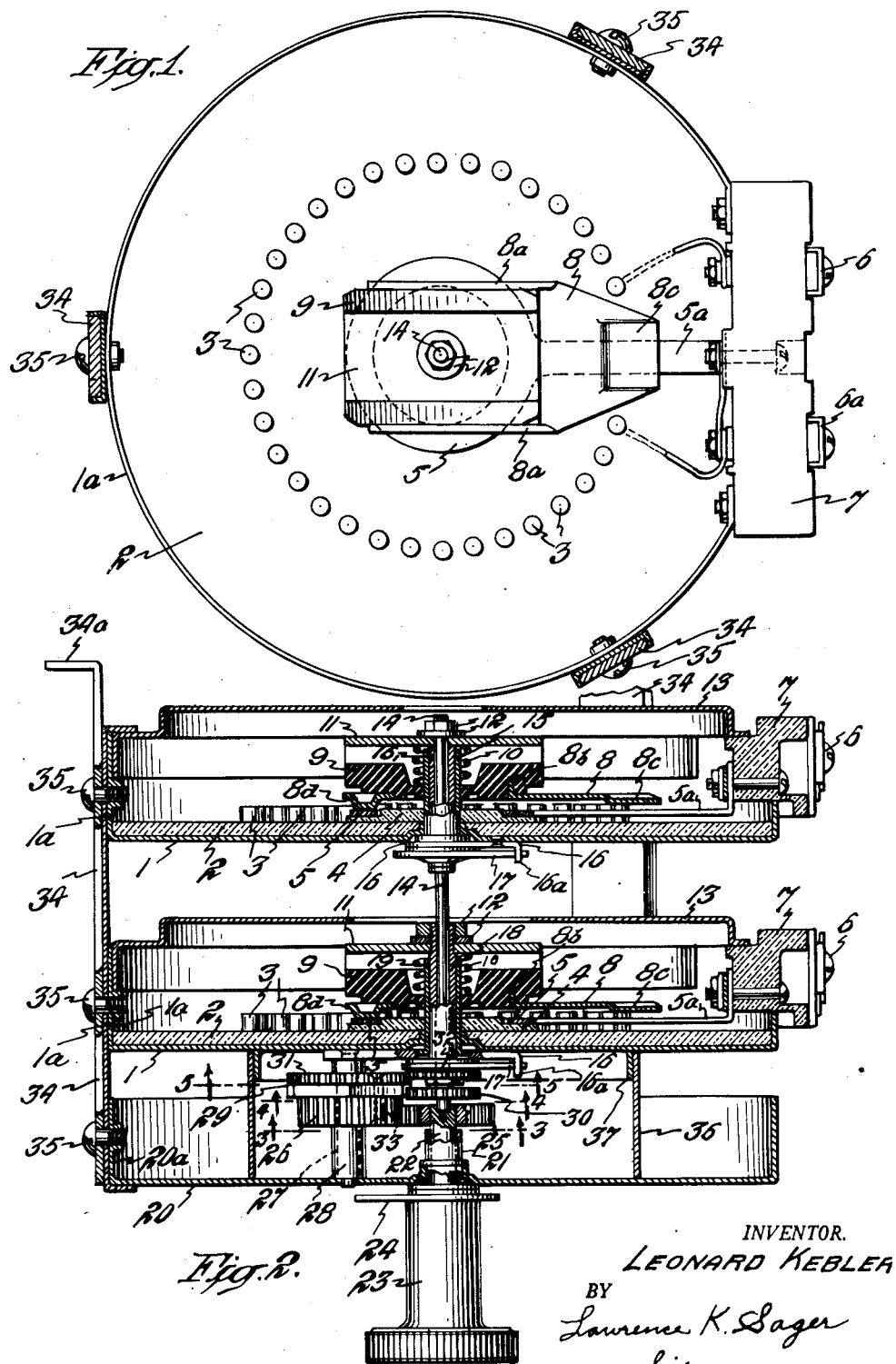

June 27, 1950 L. KEBLER 2,512,745
RHEOSTAT
Filed Dec. 11, 1948 2 Sheets-Sheet 1

INVENTOR.
LEONARD KEBLER
BY Lawrence K. Sager
his ATTORNEY

June 27, 1950          L. KEBLER          2,512,745
RHEOSTAT
Filed Dec. 11, 1948          2 Sheets-Sheet 2
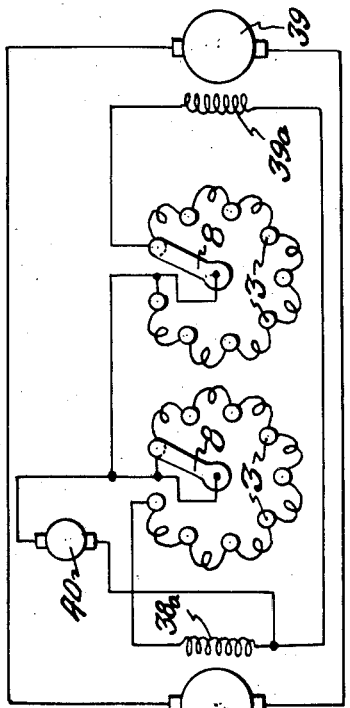
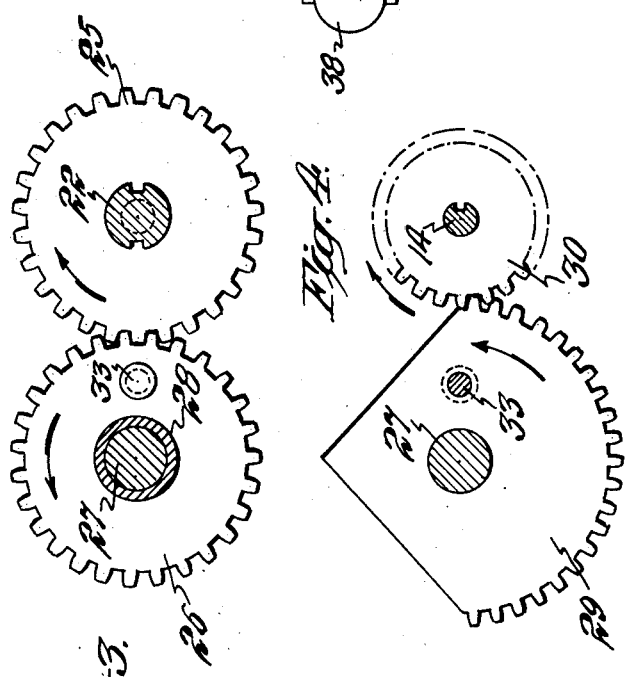
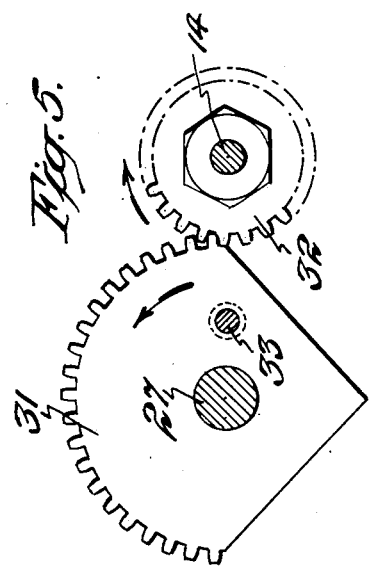
INVENTOR.
LEONARD KEBLER
BY
Lawrence K. Sager
his ATTORNEY Patented June 27, 1950

2,512,745

UNITED STATES PATENT OFFICE 2,512,745

RHEOSTAT

Leonard Kebler, Bronxville, N. Y., assignor to Ward Leonard Electric Company, a corporation of New York Application December 11, 1948, Serial No. 64,839

6 Claims. (Cl. 201—48)

This invention relates particularly to the combination of a plurality of rheostats in such a manner as to insure their operation in a definite sequence. The invention is particularly applicable to the operation of field rheostats in the Ward Leonard system of control for controlling the field strength of the generator and of the motor. In such a control system, it is important that the field of the motor be maintained at full strength while the voltage applied to the motor armature is gradually increased for increasing the speed of the motor or decreased for decreasing the motor speed. This change in speed of the motor is accomplished by gradually increasing or decreasing the field strength of the generator which supplies current to the motor armature. When the motor speed is thus increased to the speed corresponding with the full voltage applied to the motor armature, the motor speed may then be further increased by weakening the field strength of the motor. Therefore in this particular system of control, it is important that the field rheostats of the generator and motor be operated in proper sequence and adjusted in proper relation to each other for changing the speed of the motor.

When the two rheostats are separate and operated individually by separate handles, it is necessary to have more or less complicated interlocking means so that the motor field cannot be weakened unless the generator field is fully energized. Also the use of two handles is not convenient.

One way of overcoming the difficulty has been to provide a single handle on a shaft to which shaft are fixed the contact levers of both rheostats; and have one lever adjust the resistance steps of the generator field rheostat only in the first half revolution of the handle and have the lever of the motor field rheostat adjusted in the last half of the revolution of the handle for weakening the motor field, the generator field rheostat then being in the resistance all-out position. Such a structure has the disadvantage that each of the rheostats must be twice as large as would be the case if the contacts on each rheostat could be utilized over a full revolution of the contact arm. A further objection is that only one-half the number of steps are available for control on each rheostat which limits the refinement of the speed control.

Another way of securing the control of the two rheostats by one handle is disclosed in the Rich Patent No. 2,303,499 granted December 1, 1942. In that case when the handle is pushed in, it engages the generator rheostat and upon turning the handle one revolution, the generator voltage is increased to its full value; and when in that position the handle may be pulled outwardly which disconnects it from the generator rheostat and connects it with the motor rheostat. A further revolution of the handle inserts resistance in the motor field circuit gradually until the motor is brought up to full speed. This structure not only has the disadvantage that the handle is required to be pulled out or pushed in for connection with one or the other of the rheostats at a particular relationship of rheostat arms, but also has the disadvantage that two revolutions of the handle are required for the full range of motor speed control and a further disadvantage that the handle pointer does not plainly indicate the particular positions of the rheostat contact arms.

By the present invention these serious objections are overcome and full range of control of the two rheostats is obtained by one revolution of the single handle. Also the contact arm of each rheostat is adjustable over a full revolution which permits the utilization of all of the plate rheostat for the generator and for the motor and likewise secures a close graduation of the motor speed by the utilization of the full number of the contacts in each rheostat. The handle pointer also clearly indicates the condition of adjustment of the rheostats.

One object of the present invention is to combine two or more rheostats in a unit with one operating handle and to secure a full revolution of the contact arm of each rheostat in proper sequence of control by one revolution of the operating handle or control shaft. Another object is to accomplish this by a form of structure which will be compact and manufactured and sold as a complete unit. Another object is to provide a relationship of parts which is readily adaptable to secure any desired sequence of control of a plurality of rheostats for different requirements in particular cases. Other objects and advantages will be understood from the following description and accompanying drawings which illustrate a preferred embodiment of the invention in its adaptation to the Ward Leonard system of motor speed control.

Fig. 1 is a view of the back of one of the rheostats; Fig. 2 is a horizontal section of the combined rheostats and operating means; Fig. 3 is a vertical section on the line 3—3 of Fig. 2; Fig. 4 is a vertical section on the line 4—4 of Fig. 2; Fig. 5 is a vertical section on the line 5—5 of Fig.

2; and Fig. 6 is a diagram of connections of the rheostat in relation to the field windings of the generator and motor.

This improvement is applicable to any particular type of rheostat and for the purpose of illustration of the present case, the form of rheostat shown in the Howe Patent No. 2,127,083 granted August 16, 1938 is selected in this particular instance. Two such rheostats are shown in Fig. 2 hereof and a general description of one will suffice for both with similar reference characters applied to each.

Each rheostat comprises a sheet metal plate 1 having a circumferential rim 1a which supports resistive conductors embedded in insulating material 2. The rheostat contact buttons 3 project from the embedding insulation and, of course, the resistive conductors are connected between the contacts. On the inner face of the embedding insulation is an insulating disc 4 on which is seated a metal conductor ring 5. A strip 5a extends from this ring and is electrically connected at its end to one of the terminals 6 or 6a mounted on the terminal block 7. The contact arm 8 of each rheostat is in the form of a flat plate having outwardly bent sides 8a for reception of an insulating block 9. This block has an inwardly projecting circular portion which projects within a central opening of the contact arm; and a lug 8b is bent from a central portion of the contact arm for engaging a hole in the inner face of the block 9. The insulating block and contact arm are thus held in fixed relation to each other by the side portions 8a which embrace the sides of the block and by the lug 8b which prevents endwise movement of the block. The contact arm extends outwardly at one end and has a depressed portion 8c for engaging the contacts 3 successively as the arm is turned. The opposite end of the contact arm has another depressed portion 8d which engages the ring 5. The central portion of the insulating block 9 is provided with an enlarged circular cavity in which is seated a spiral spring 10 for imposing pressure on the block 9 and on the contact arm sufficiently to maintain a desirable electrical engagement of the contact arm with the contacts 3 and the ring 5 in all positions. A plate 11 is positioned against the rear end of the spring for imposing pressure thereon and is held between the two rearwardly extending side portions of the insulating block by a nut and washer 12 on parts later described. A cover plate 13 is applied to the rear of each of the rheostats for protecting them from dust and dirt. Although this general form of rheostat structure has been described, any other suitable form may be used.

Considering first the rear rheostat, the contact arm is actuated by a shaft 14 on which the nut 12 is applied at the rear end for holding the plate 11 in position. This plate is keyed to the shaft 12. The rheostat has a central opening within which is fixed a bearing sleeve 15 lined with a bushing 16' in which the shaft 14 is journaled. A disc 16 surrounds the shaft and is fixed to the plate 1 and has a forwardly projecting end 16a. This projecting end forms a stop which is engaged by an arm 17 when the contact arm is in the resistance all-in and resistance all-out positions. This arm is fixed to the shaft 14.

The shaft 14 extends forwardly through a hollow shaft 18 which is journaled in a bearing 19. This bearing extends through a central opening in the plate of the front rheostat and is fixed thereto. The nut 12 of the front rheostat is threaded on the inner end of the hollow shaft 18 for holding the plate 11 and other parts of the front rheostat in position, this plate 11 being keyed to the shaft 18. It is apparent that when the hollow shaft 18 is rotated, it will adjust the position of the contact arm 8 of the front rheostat; and when the shaft 14 is turned, it will adjust the position of the contact arm 8 of the rear rheostat. The front rheostat is provided with a stop 16, 16a similar to that of the rear rheostat and an arm 17 of the front rheostat is fixed to the hollow shaft 18 for engaging the stop in the resistance all-in and resistance all-out positions of the contact arm of the front rheostat.

The front portion of the unit is enclosed by a cover plate 20 having an inturned edge 20a. In a central opening through this plate is fixed a bearing sleeve 21 for receiving a short actuating shaft 22 which is in alignment with the common axis of the shafts 14 and 18. The front end of the shaft 22 projects through the plate 20 and has fixed thereto an operating handle 23. A pointer 24 at the inner end of the handle is for indicating the position of the contact arms of the two rheostats.

A gear 25 is fixed to the inner end of the shaft 22 and engages a gear 26 which is mounted on a pin or countershaft 27. This pin is supported at its inner end against the plate 1 of the front rheostat and at its outer end by the plate 20. A spacing sleeve 28 is between the gear 26 and the plate 20. The gears 25 and 26 have the same number of teeth, as shown in Fig. 3, which results in one revolution of the handle 23 and gear 25 imposing one revolution on the gear 26. A segmental gear 29 is positioned at the rear of the gear 26 and is similarly mounted on the pin 27. This segmental gear is provided with teeth on half of its periphery as particularly shown in Fig. 4. This segmental gear meshes during one-half of its revolution with a gear 30 which is fixed to the shaft 14, the front end of the shaft 14 being journaled in the inner end of the shaft 22, as shown in Fig. 2. The gear 30 has teeth on its entire periphery and is of the same number as the teeth on the gear 29, as shown in Fig. 4. It results that when the gear 29 is turned one-half of a revolution, the gear 30 is turned a full revolution. Another segmental gear 31 is mounted on the pin 27 back of the gear 29 and is provided with teeth on only one-half of its periphery, as shown in Fig. 5. This gear meshes with another gear 32 which is fixed to the front end of the hollow shaft 18. The number of teeth on the gear 32 is the same as the number of teeth on the segmental gear 31 and it therefore results that when the gear 31 is turned one-half of a revolution, the gear 32 will be turned a full revolution.

The gears 26, 29 and 31 are maintained in fixed relation to each other by a rivet 33 passing through them and this relationship is such that the two peripheries of the gears 29 and 31 are on opposite sides of their axis, as shown in Figs. 4 and 5. The parts are positioned so that when the pointer 24 on the handle is in its initial position, the contact arms of the rheostats will be in their initial positions. The gears will then have the relationship shown in Figs. 4 and 5. It follows that when the handle 23 is turned in a clockwise direction from its initial position, the gears on the pin 27 will be turned in a counter-clockwise direction with the result that in the first half revolution of the handle, the gear 30 and contact arm 8 of the rear rheostat will be turned a full revolution. During the next half turn of the handle, the gear 30 and contact arm 8 of the rear rheostate will not be moved, but the gear 32 and contact arm 8 of the front rheostat will be moved a full revolution. More strictly speaking, the gears 30 and 32 and the contact arms 8 will not be moved a full revolution as some allowance is made for moving the contact arms only from the first contact button of the rheostats to the last contact button which is accomplished by the segmental gears not having their teeth on quite the full half of their peripheries.

It is apparent that when the handle or its shaft is turned one revolution, the contact arm of one rheostat is first operated over its complete range of approximately one revolution and then while it remains stationary, the other contact arm of the other rheostat is turned over its full range of control in approximately a full revolution. The position of the pointer 24 on the actuating shaft will always indicate the relative positions of the contact arms, because in the first half of its revolution, the pointer shows the adjustment of the contact arm of one rheostat and during the second half of its revolution it shows the adjusted position of the contact arm of the other rheostat. Also, a definite sequence of control of the two contact arms is insured with reference to each other without the need of any auxiliary parts or change of mechanical connections in passing from one rheostat control to the other. The rheostats and front plate are united as a unit by circumferentially spaced strips 34 which extend crosswise to the plates, as shown in Figs. 1 and 2, and are secured to the rims 1a and 20a by the screw bolts 35. The strips 34 are provided with ends 34a bent at right-angles for supporting on a panel or otherwise. The gearing is protected by a cylindrical collar 36 which slips over a rim 37 fixed to the plate 1 of the front rheostat, as by welding or otherwise.

A particular application of this improvement is indicated in Fig. 6 for securing control of the speed of a motor according to the Ward Leonard system. Here a direct current generator is indicated having an armature 38 and a field winding 38a. This generator supplies current to a motor having an armature 39 and a field winding 39a. The armature of the generator and motor are directly connected together electrically. The field windings of the two machines are supplied with current from any available constant voltage source of direct current as indicated by the numeral 40. The connections of the field windings of the machines and of their respective rheostats are shown at the condition of lowest motor speed. Thus the connection from the source 40 passes to the contact arm 8 of the generator field rheostat, then through all of the resistance of this rheostat, through the field winding 38a and back to the source. This gives the generator a weakened field. The motor field is supplied from the source 40 to the contact arm 8 of the motor field rheostat, then through the motor field winding back to the source. Thus the motor then has its full field strength. This is the condition when the pointer 24 of the rheostat unit is in its initial position. When the actuating shaft 22 is turned in a clockwise direction from this initial position the result, as already explained, is to turn the contact arm 8 of the rear rheostat from its initial position in a clockwise direction. The rear rheostat is the field rheostat of the generator; and, as diagrammatically represented in Fig. 6, a clockwise movement of the arm 8 at the left of the diagram results in gradually removing resistance from the field winding of the generator and correspondingly gradually increases its field strength. This increases the generator voltage and thereby increases the motor speed. When the contact arm of the generator field rheostat reaches its resistance all out position by the first half revolution of the actuating shaft 22, the contact arm 8 of the motor rheostat begins to turn in a clockwise direction and as diagrammatically indicated in Fig. 6, a clockwise movement of the arm 8 of the right-hand rheostat of Fig. 6 which is the motor field rheostat, results in gradually weakening the field strength of the motor and further increasing its speed. Evidently with this relationship of parts and connections, the field strength of the motor can only be weakened when the field of the generator is at its full strength, and the field of the generator can be weakened only when the motor field is at its full strength.

Although a definite sequence of control of two rheostats over their full circumferential range by one revolution of the actuating shaft has been particularly disclosed and its application to a particular purpose explained, it will be understood that various modifications may be made for adaptation to particular circumstances without departing from the scope of the invention. For example, three rheostats could be united and operated in a particular sequential relationship by providing an additional segmental gear on the counter-shaft or pin 27 and with the teeth on each of the gears extending over only one-third of the periphery of each and respectively engaging gears on the shafts of the rheostat arms, such gears each having the same number of teeth as on each segmental gear. The segmental gears could be coupled in relation to each other to give any desired sequence of control of the rheostats. Likewise the segmental gears could be provided with spaced groups of teeth on their peripheries and the segmental gears mechanically coupled together in such manner that first one rheostat may be operated, then another, then the first, then two or more at the same time and so on for securing any desired sequential movement and extent of movement of the contact arms for any desired purpose, all with one revolution of the actuating shaft or handle. Also, instead of turning the actuating shaft by a handle, any other means may be utilized to turn it. Also if desired, the handle or other driving means could be directly applied to the front end of the pin or shaft 27 and the segmental gears thereon fixed to the shaft 27. Various other modifications may, of course, be made.

I claim:

1. A rheostat unit comprising a plurality of rheostats, each of said rheostats having a contact arm and shaft for turning the contact arm, said shafts having a common axis of rotation, a gear fixed to each of said shafts respectively, a segmental gear for driving each of said gears respectively, said segmental gears having a common axis and being in fixed relation to each other for driving said first named gears in a predetermined sequence, and means comprising an actuating shaft for turning said segmental gears.

2. A rheostat unit comprising a plurality of rheostats, each of said rheostats having a contact arm and shaft for turning the contact arm, said shafts having a common axis of rotation, a gear fixed to each of said shafts respectively, a segmental gear for driving each of said gears respectively, said segmental gears being in fixed relation to each other for driving said first named gears in a predetermined sequence, and means comprising an actuating shaft for turning said segmental gears, the number of teeth on each of said segmental gears being approximately the same as the number of teeth on each of said first named gears for securing approximately a full revolution of each of said first named gears upon approximately one revolution of said segmental gears.

3. A rheostat unit comprising a plurality of rheostats, each of said rheostats having a contact arm and shaft for turning the contact arm, said rheostats being mounted in alignment and said shafts having a common axis of rotation, a gear on each of said shafts and adjoining each other, a segmental gear for driving each of said gears respectively, said segmental gears adjoining each other and in fixed relation to each other on a common axis for driving said first named gears in a predetermined sequence, and means comprising an actuating shaft for turning said segmental gears.

4. A rheostat unit comprising a plurality of rheostats, each of said rheostats having a contact arm and shaft for turning the contact arm, said rheostats being mounted in alignment and said shafts having a common axis of rotation, a gear on each of said shafts and adjoining each other, a segmental gear for driving each of said gears respectively, said segmental gears adjoining each other and in fixed relation to each other for driving said first named gears in a predetermined sequence, and means comprising an actuating shaft for turning said segmental gears, the number of teeth on each of said segmental gears being approximately the same as the number of teeth on each of said first named gears for securing approximately a full revolution of each of said first named gears upon approximately one revolution of said segmental gears.

5. A rheostat unit comprising a plurality of rheostats, each of said rheostats having a contact arm and shaft for turning the contact arm, said rheostats being mounted in alignment and said shafts having a common axis of rotation, a gear on each of said shafts and adjoining each other, a segmental gear for driving each of said gears respectively, said segmental gears adjoining each other and in fixed relation to each other on a common axis for driving said first named gears in a predetermined sequence, an actuating shaft in alignment with said first named axis, and gearing for driving said segmental gears approximately one revolution upon turning said actuating shaft approximately one revolution.

6. A rheostat unit comprising a plurality of rheostats, each of said rheostats having a contact arm and shaft for turning the contact arm, said rheostats being mounted in alignment and said shafts having a common axis of rotation, a gear on each of said shafts and adjoining each other, a segmental gear for driving each of said gears respectively, said segmental gears adjoining each other and in fixed relation to each other for driving said first named gears in a predetermined sequence, an actuating shaft in alignment with said axis, and gearing for driving said segmental gears approximately one revolution upon turning said actuating shaft approximately one revolution, the number of teeth on each of said segmental gears being approximately the same as the number of teeth on each of said first named gears for securing approximately a full revolution of each of said first named gears upon approximately one revolution of said segmental gears.

LEONARD KEBLER.

REFERENCES CITED

The following references are of record in the file of this patent:

UNITED STATES PATENTS

| Number | Name | Date |
| --- | --- | --- |
| 539,585 | Kraemer et al. | May 21, 1895 |
| 758,164 | Yates | Apr. 26, 1904 |
| 1,351,019 | Boothman | Aug. 31, 1920 |
| 2,071,316 | Aurandt | Feb. 23, 1937 |
| 2,303,499 | Rich | Dec. 1, 1942 |